(12) United States Patent
Eliáš et al.

(10) Patent No.: US 9,571,478 B2
(45) Date of Patent: Feb. 14, 2017

(54) CONDITIONAL REQUEST PROCESSING

(71) Applicant: Red Hat, Inc., Raleigh, NC (US)

(72) Inventors: Filip Eliáš, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 179 days.

(21) Appl. No.: 14/151,644

(22) Filed: Jan. 9, 2014

(65) Prior Publication Data
US 2015/0195377 A1    Jul. 9, 2015

(51) Int. Cl.
| H04L 29/06 | (2006.01) |
|---|---|
| H04L 12/24 | (2006.01) |
| H04L 29/08 | (2006.01) |

(52) U.S. Cl.
CPC ............ *H04L 63/08* (2013.01); *H04L 41/083* (2013.01); *H04L 67/02* (2013.01)

(58) Field of Classification Search
CPC ......... H04L 63/08; H04L 68/02; H04L 41/083
See application file for complete search history.

(56) References Cited

U.S. PATENT DOCUMENTS

| 7,130,877 | B2 | 10/2006 | McNeely et al. | |
|---|---|---|---|---|
| 7,458,095 | B2 | 11/2008 | Forsberg | |
| 7,721,278 | B2 * | 5/2010 | Alam | G06F 9/44521 717/131 |
| 7,954,139 | B1 | 5/2011 | Hall | |
| 8,326,911 | B2 | 12/2012 | Weinert et al. | |
| 2010/0107225 | A1 | 4/2010 | Spencer et al. | |
| 2011/0029899 | A1* | 2/2011 | Fainberg | G06F 17/30902 715/760 |
| 2011/0093790 | A1* | 4/2011 | Maczuba | G06F 17/30902 715/745 |
| 2012/0079570 | A1* | 3/2012 | Fu | H04L 9/3213 726/5 |
| 2013/0191498 | A1* | 7/2013 | Crockett | G06F 17/3089 709/217 |

OTHER PUBLICATIONS

N.L. Clarke, S.M. Furnell, Advanced User Authentication for Mobile Devices, Computers & Security 26 (2007), pp. 109-119, © 2006 Elsevier Ltd.
Kazuhiko Sagara et al., A Distributed Authentication Platform Architecture for Peer-to-Peer Applications, Mar. 2005, pp. 865-872, © 2005 The Institute of Electronics, Information and Communication Engineers.

(Continued)

*Primary Examiner* — Shirley Zhang
(74) *Attorney, Agent, or Firm* — Haynes and Boone, LLP

(57) ABSTRACT

A method and system for processing a request is provided. An example system includes a security module that authenticates a request from a client. The system also includes a Web service that determines whether the set of operations includes an input/output (I/O) operation and determines whether a result of the authentication has been determined. While the request is pending authentication, the Web service may initiate processing of the request and may ensure that no I/O operations are performed within the processing of the request until a request of the authentication has been determined.

15 Claims, 5 Drawing Sheets

(56) References Cited

OTHER PUBLICATIONS

Configuring Reverse Proxy in Web Server, Oracle iPlanet Web Server 7.0.9 Administrator's Guide, retrieved on Mar. 5, 2014 from http://docs.oracle.com/cd/E19146-01/821-1828/ghquv/ 7 pages, © 2010 Oracle Corporation and/or its affiliates.
Andrew Alexeev, nginx, The Architecture of Open Source Applications, retrieved on Mar. 5, 2014 from http://www.aosabook.org/en/nginx.html, 13 pages, vol. II: Structure, Scale and a Few More Fearless Hacks; Creative Commons Attribution 3.0 Unported license.

* cited by examiner

CONDITIONAL REQUEST PROCESSING

FIELD OF THE ART

The present disclosure generally relates to computing devices, and more particularly to processing a request.

BACKGROUND

The present disclosure generally relates to computing devices, and more particularly to processing a request. When a client sends a request to a Web service, the request is processed by the Web service. The Web service may determine whether a result of the authentication has been determined before processing of the request has been initiated. Authentication of the client request may take a significant amount of time. For example, the client may send a connection request along with a username and password to a Web server hosting the Web service. The Web server may authenticate the client request by determining whether the sent username is stored in a database. If the sent username is found in the database, the Web server may compare a password associated with the username stored in the database with the sent password. Additionally, the password may be ciphered, further increasing the time it takes to authenticate the request. This may contribute to the time it takes to process a request.

BRIEF SUMMARY

This disclosure relates to processing a request. Methods, systems, and techniques for processing a request are provided.

According to an embodiment, a method of processing a request includes receiving, from a client, a request for processing, where processing of the request includes performing a set of operations based on an order. The method also includes determining whether the set of operations includes an input/output (I/O) operation. The method further includes determining whether a result of the authentication has been determined. The method also includes while the request is pending authentication, initiating processing of the request and when the set of operations is determined to include an I/O operation: (i) performing, based on the order, one or more operations of the set of operations preceding the I/O operation; (ii) when the result of the authentication has not been determined, waiting for the result of the authentication to be determined; and (iii) when the result of the authentication indicates that the request has been successfully authenticated, performing one or more remaining operations of the set of operations that has not been processed and determining a result of the processed request based on performing the set of operations, where the one or more remaining operations includes the I/O operation.

According to another embodiment, a system for processing a request includes a server interface that receives, from a client, a request for processing. Processing of the request includes performing a set of operations based on an order. The system also includes a Web service that determines whether the set of operations includes an input/output (I/O) operation and determines whether a result of the authentication has been determined. While the request is pending authentication, the Web service initiates processing of the request, and when the set of operations is determined to include an I/O operation, (i) the Web service performs, based on the order, one or more operations of the set of operations preceding the I/O operation, (ii) when the result of the authentication has not been determined, the Web service waits for the result of the authentication to be determined, and (iii) when the result of the authentication indicates that the request has been successfully authenticated, the Web service performs one or more remaining operations of the set of operations that has not been processed and determines a result of the processed request based on performing the set of operations, where the one or more remaining operations includes the I/O operation.

According to another embodiment, a non-transitory machine-readable medium includes a plurality of machine-readable instructions that when executed by one or more processors are adapted to cause the one or more processors to perform a method including: receiving, from a client, a request for processing, where processing of the request includes performing a set of operations based on an order; determining whether the set of operations includes an input/output (I/O) operation; determining whether a result of the authentication has been determined; and while the request is pending authentication, initiating processing of the request, and when the set of operations is determined to include an I/O operation: (i) performing, based on the order, one or more operations of the set of operations preceding the I/O operation; (ii) when the result of the authentication has not been determined, waiting for the result of the authentication to be determined; and (iii) when the result of the authentication indicates that the request has been successfully authenticated, performing one or more remaining operations of the set of operations that has not been processed and determining a result of the processed request based on performing the set of operations, wherein the one or more remaining operations includes the I/O operation.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
  A. Authenticate Request
  B. Initiate Processing the Request
  C. Example Thread Object
  D. Prevent I/O Operations Until Request Has Been Successfully Authenticated 1. No I/O Operations Performed Within Request Processing
2. I/O Operations Performed Within Request Processing III. Example Method IV. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

When a client sends a request to a Web service, the request is typically authenticated before it is processed by the Web service. The Web service may determine whether a result of the authentication has been determined before processing of the request has been initiated. Authentication of the client request may take a significant amount of time. If the request is successfully authenticated, the Web service may then initiate processing of the request. If the request fails authentication, however, the request is rejected and not processed by the Web service. During the period of time between receiving the client request and successful authentication of the request, the Web service does not process the request.

This disclosure provides a technique to reduce user perceived latencies in request processing. For example, the disclosure introduces conditional request processing, which allows the Web service to initiate processing the client request before the authentication is complete. In this way, the period of idle time between receiving the request and a result of the request authentication is used and the response time of the Web service may be decreased. A side effect of processing the request before it has been authenticated, however, may cause problems if persistent changes are made (e.g., to a database or file system). It may also cause problems if the Web service sends any secret information (e.g., to the client or another computing device) before a result of the request authentication is determined to be successful. Accordingly, it may be advantageous to ensure that input/output (I/O) operations within the processing of the request are forbidden until the request has been successfully authenticated.

II. Example System Architecture

Figure 1:
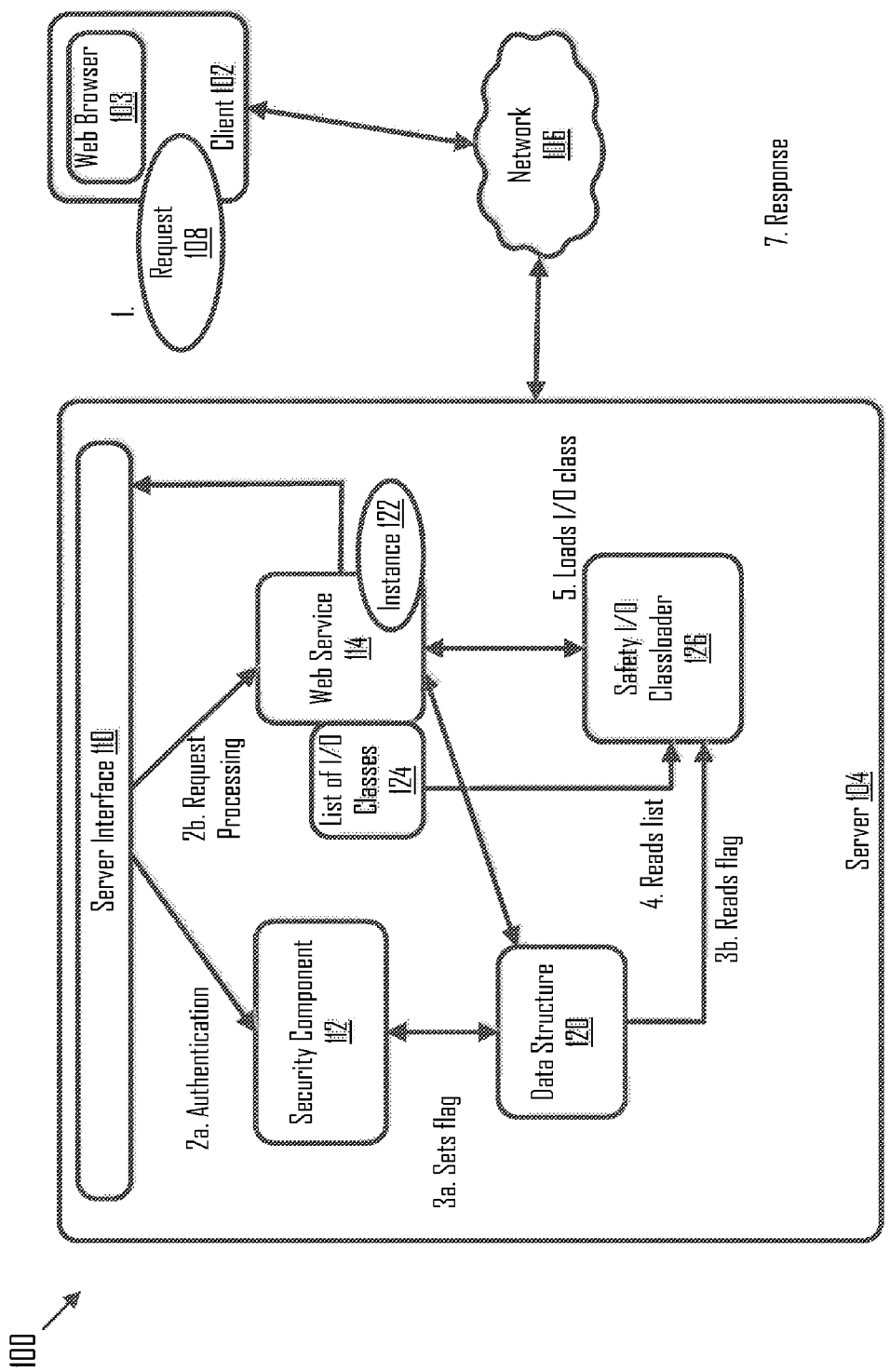
FIG. 1 is a block diagram illustrating a system for processing a request, according to an embodiment.

FIG. 1 is a block diagram 100 illustrating a system for processing a request, according to an embodiment. Diagram 100 includes a client 102 and a server 104 coupled to a network 106. Client 102 and server 104 may communicate with each other via network 106. In an example, client 102 executes a web browser 103 that sends one or more requests 108 to server 104. A web browser is a software application that acts as an interface between client 102 and the World Wide Web. Server 104 hosts a Web service 114 that processes client requests. In response to receiving request 108, Web service 114 may process request 108 to determine a result, and server 104 may send client 102 a response including the result.

Network 106 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and HTTP, and various combinations of the foregoing.

A. Authenticate Request

Server 104 includes a server interface 110, a security component 112, and a Web service 114. Server interface 110 receives, from client 102, request 108 for processing. Server interface 110 sends a copy of request 108 to Web service 114 for processing and also sends a copy of request 108 to security component 112. Security component 112 authenticates request 108 by, for example, authenticating the client that sent the request. Security component 112 may be a security handler for Simple Object Access Protocol (SOAP) requests or a login module for Hypertext Transfer Protocol (HTTP) requests or Representational State Transfer (REST) requests.

In an example, client 102 sends a connection request along with a username and password to server 104 hosting Web service 114. Security component 112 may authenticate request 108 by determining whether the sent username is stored in a database. If the sent username is found in the database, server 104 may compare a password associated with the username stored in the database with the sent password. Security component 112 may determine a result of the request authentication based on whether the username is found in the database and whether the password stored in the database and associated with the username matches the sent password. For example, if the sent username and password matches the corresponding username and password stored in the database, security component 112 may determine that the request has been successfully authenticated. In contrast, if the sent username and password does not match the corresponding username and password stored in the database, security component 112 may determine that the request has failed authentication.

In another example, security component 112 identifies client 102's Internet Protocol (IP) address and determines whether the IP address is included in a list of untrusted IP addresses or included in a list of trusted IP addresses. Security component 112 may determine a result of the request authentication based on whether the IP address is included in the list of trusted or untrusted IP addresses. For example, if client 102's IP address is included in a list of trusted IP addresses, security component 112 may determine that the request has been successfully authenticated. If client 102's IP address is included in a list of untrusted IP addresses, security component 112 may determine that the request has failed authentication.

Server 104 may store information regarding the status of the authentication request. In an embodiment, server 104 includes a memory that stores a data structure 120 that stores one or more associations between a key and an authentication flag. In an example, the key is a request identifier that identifies a client request and the authentication flag indicates a status of the authentication of the request. Security component 112 may set the authentication flag to an initial value indicating that a result of the request has not yet been determined, to a value indicating that the request has been successfully authenticated, and/or to a value indicating that the request has failed authentication.

Web service 114 may read the authentication flag value associated with a request to determine a status of the authentication of the request. In an example, the authentication flag is a Boolean value that is set to an initial value of "0" or "false" to indicate that a result of the request has not yet been determined. In such an example, security component 112 may set the authentication flag to "1" or "true" to indicate that a result of the request has been successfully authenticated. In another example, the authentication flag is an integer value, and security component 112 sets the authentication flag to a first value to indicate that a result of the request has not yet been determined, sets the authentication flag to a second value to indicate that a result of the request has been successfully authenticated, and sets the authentication flag to a third value to indicate that a result of the request has failed authentication. Authentication flag may be of other value types (e.g., string type), and other ways to set the values are within the scope of the disclosure.

Figure 2:
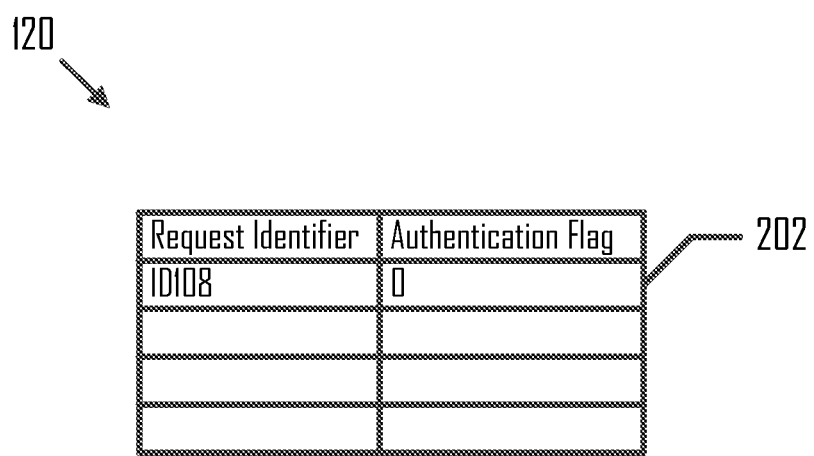
FIG. 2 illustrates an example of a data structure that stores an association between a request identifier and a corresponding authentication flag, according to an embodiment.

FIG. 2 illustrates an example of data structure 120 that stores an association between a request identifier and a corresponding authentication flag, according to an embodiment. In FIG. 2, data structure 120 is a hash table that stores one or more mappings of a request identifier to a value. The request identifier may be used as a key of the hash table. In an example, based on receiving request 108, Web service 114 creates a request identifier "ID108" that identifies request 108 and sets an initial value of the authentication flag corresponding to request identifier "ID108". The initial value of the authentication flag may indicate that a result of request 108 has not yet been determined. As illustrated in the example of FIG. 2, the value indicating that the result of the request has not yet been determined is "0." Web service 114 inserts into data structure 120 an entry 202 that associates request identifier "ID108" with "0," the initial value of the authentication flag corresponding to request 108.

Security component 112 may authenticate request 108 and set the value of the authentication flag corresponding to a result of the authentication. For example, security component 112 may set the value of the authentication flag based on whether the request has been successfully authenticated and/or has failed authentication. In an example, if the request has been successfully authenticated, security component 112 modifies the value of the authentication flag to indicate that the request has been successfully authenticated. In such an example, security component 112 may set the new value of the authentication flag to "1." During processing of request 108, web service 114 may read from data structure 120 the authentication flag indicating that request 108 has been successfully authenticated and continue to process request 108 to completion (e.g., even if processing of request 108 includes an I/O operation).

After request 108 has been determined to be successfully authenticated and processed, web service 114 may remove from data structure 120 the entry corresponding to request 108. For example Web service 114 may remove from data structure 120 the entry including request identifier "ID108" that identifies the successfully processed request and the authentication flag associated with the request identifier "ID108".

Security component 112 may perform different actions based on whether the request has failed authentication. In an example, if request 108 has failed authentication, security component 112 may inform Web service 114 that the request authentication has failed. If Web service 114 is still in the process of processing request 108, security component 112 may interrupt Web service 114's processing of request 108. When Web service 114 is interrupted and informed that the authentication has failed, Web service 114 may stop processing the request. For example, when the result of the authentication indicates that the request has failed authentication, Web service 114 may halt processing of the request. If Web service 114 has finished processing request 108, Web service 114 may discard the result.

In another example, if the request has failed authentication, security component 112 modifies the value of the authentication flag to indicate that the request failed authentication. In such an example, security component 112 may set the new value of the authentication flag as "2." After request 108 has been determined to fail authentication, web service 114 may stop processing request 108 and remove from data structure 120 the entry corresponding to request 108. For example, Web service 114 may remove from data structure 120 the entry including request identifier "ID108" that identifies the request that failed authentication and the authentication flag associated with the request identifier "ID108".

B. Initiate Processing the Request

Server interface 110 receives request 108 and passes it along to Web service 114 for processing. Server 104 includes a Web service 114 that processes requests from clients. In an example, Web service 114 processes request 108 by performing a set of one or more operations based on an order. Rather than wait for security component 112 to authenticate the request and then initiate processing of the request, Web service 114 may initiate processing of the request while it is pending authentication. In an example, a time period in which security component 112 authenticates the request overlaps with a time period in which Web service 114 processes the request. In such an example, security component 112 may initiate authenticating request 108 at the same time (or approximately the same time) that Web service 114 initiates processing request 108, and the authentication and processing of request 108 may run in parallel. While processing request 108, if Web service 114 comes to an I/O operation, Web service 114 may either continue processing request 108 or stop processing request 108 depending on a result of the authentication. Web service 114 may stop and wait for the authentication of request 108 to complete if it has not already done so. If request 108 has been successfully authenticated, Web service 114 may continue processing request 108. If request 108 has failed authentication, Web service 114 may stop processing request 108.

Figure 3:
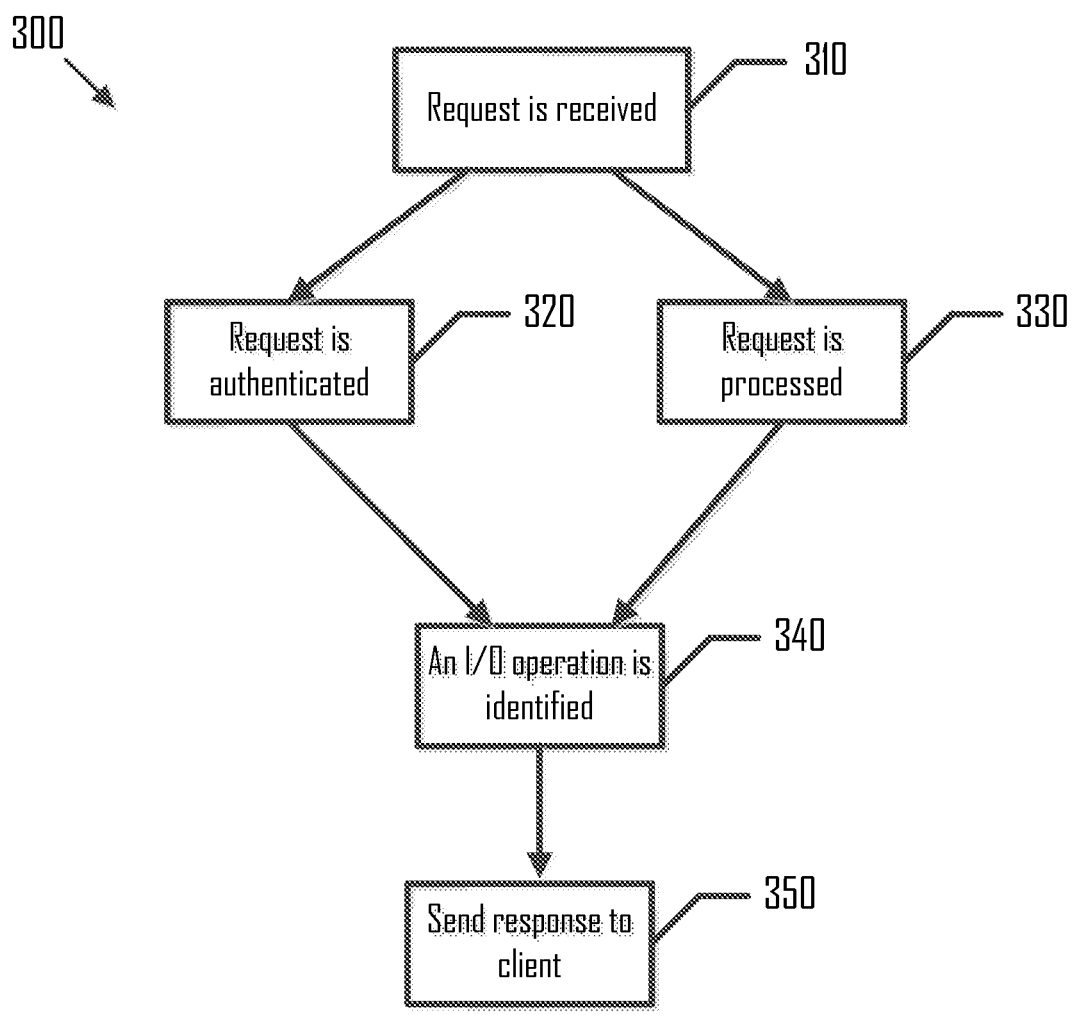
FIG. 3 is a flowchart illustrating a method of authenticating and processing a request in parallel, according to an embodiment.

FIG. 3 is a flowchart illustrating a method 300 of authenticating and processing a request in parallel, according to an embodiment. Method 300 is not meant to be limiting and may be used in other applications. Method 300 includes blocks 310-350. In a block 310, a request is received. In an example, server interface 110 receives request 108. In a block 320, the request is authenticated. In an example, security component 112 authenticates request 108. In a block 330, the request is processed. In an example, Web service 114 processes request 108. Blocks 320 and 330 may be executed in parallel. To process the request, Web service 114 may perform a set of operations based on an order. Web service 114 may perform operations of the set of operations.

In an example, if the set of operations does not include an I/O operation, Web service 114 may continue to perform all operations of the set of operations and determine a result of request 108. Web service 114 may wait for security component 112 to authenticate request 108. If the request has been successfully authenticated, Web service 114 sends a response including the result to client 102. If the request has failed authentication, Web service 114 stops processing the request and/or disregards the request.

In another example, if the set of operations includes an I/O operation, Web service 114 may continue processing one or more operations of the set of operations up until the I/O operation. In a block 340, an I/O operation is identified in the set of operations. In an example, Web service 114 identifies the I/O operation in the set of operations. Web service 114 may perform, based on an order, one or more operations preceding the I/O operation. In such an example, Web service 114 may perform, based on the order, all operations preceding the I/O operation. The processing of request 108 may be partially completed when Web service 114 stops processing the request and waits for the request to be authenticated. In a block 350, after the request has been both successfully authenticated and processed, a response responsive to the request may be sent to the client. In an example, Web service 114 may finish processing request 108, determine a result, and send a response including the result to client 102.

It is also understood that additional processes may be inserted before, during, or after blocks 310-350 discussed above. It is also understood that one or more of the blocks of method 300 described herein may be omitted, combined, or performed in a different sequence as desired.

C. Example Thread Object

Referring back to FIG. 1, to initiate processing request 108, Web service 114 may instantiate an instance 122 of a thread object of a first type. The thread object of the first type includes a request identifier attribute that stores the request identifier. The request identifier attribute may be used at a later point to connect a specific instance of the thread object to a specific request. In an example, the thread object of the first type extends the JAVA® class Thread and includes the request identifier attribute. Trademarks are the property of their respective owners. Web service 114 may maintain a pool of threads of the first type and remove a thread from the pool to determine instance 122.

Table A illustrates an example class definition of a class ThreadFirstType, a thread object of the first type including a request identifier attribute.

TABLE A

```
public class ThreadFirstType {
    public string requestIdentifierAttribute;
    ...}
```

Referring to FIG. 2 and Table A, Web service 114 may insert the request identifier "ID108" (see FIG. 2) as a value of "requestIdentifierAttribute" (see Table A) into instance 122 and initiate processing of request 108 using instance 122. In particular, Web service 114 uses instance 122 to process request 108. Additionally, Web service 114 may determine the particular request that instance 122 is processing by reading instance 122's value of attribute "requestIdentifierAttribute". Web service 114 may then use the value of instance 122's attribute "requestIdentifierAttribute" as a key into data structure 120 to determine a result of the authentication of the request identified by the request identifier. The result of the authentication of the request may be determined by reading the authentication flag value corresponding to the request.

If the request has been successfully authenticated, security component 112 may set the value of the authentication flag to "1", where the authentication flag corresponds to the request identifier "ID108", which may be the key into data structure 120. If instance 122 is processing request 108, Web service 114 may identify entry 202 by using request identifier "ID108" stored in instance 122 and read the authentication flag corresponding to request identifier "ID108" as "1." The request identifier "ID108" is the value of requestIdentifierAttribute of instance 122.

D. Prevent I/O Operations Until Request Has Been Successfully Authenticated

Processing of request 108 may include performing a set of operations based on an order. As discussed, Web service 114 may prevent I/O operations included in the set of operations from being performed until request 108 has been successfully authenticated. In an example, Web service 114 may determine whether the set of operations includes an I/O operation and ensure that no persist operations are performed until request 108 has been successfully authenticated. An example of a persist operation is an I/O operation that writes to a file or a database or sends messages to another server or subsystem.

1. No I/O Operations Performed Within Request Processing

When the set of operations is determined to not include an I/O operation, Web service 114 performs, based on the order, the set of operations and determines a result of processing request 108 based on performing the set of operations. If the request has been successfully authenticated, server interface 110 may return a response including the result to client 102. If the request has failed authentication, Web service 114 may discard the result if it has already been determined or may stop processing the request if the result has not yet been determined.

2. I/O Operations Performed Within Request Processing

When the set of operations is determined to include an I/O operation, Web service 114 performs, based on the order, one or more operations of the set of operations preceding the I/O operation. In an example, as Web service 114 is processing operations of the set of operations, Web service 114 determines whether the particular operation to be processed is an I/O operation. If the particular operation is not an I/O operation, Web service 114 may perform the operation and determine whether the next operation is an I/O operation. Web service 114 may continue to iterate through the operations of the set of operations and perform these actions until an I/O operation is identified or until all of the operations of the set of operations is performed. When an I/O operation is determined to be within the set of operations, Web service 114 may stop processing the request until a result of the authentication has been determined. In another example, Web service 114 scans the set of operations and determines whether it includes an I/O operation. Web service 114 may process the set of operations up until the I/O operation and stop processing the request until a result of the authentication has been determined.

When the set of operations is determined to include an I/O operation and the result of the authentication has not been determined, Web service 114 waits for the result of the authentication to be determined. When the set of operations is determined to include an I/O operation and when the result of the authentication indicates that the request has been successfully authenticated, Web service 114 performs one or more remaining operations of the set of operations that has not been processed and determines a result of the processed request based on performing the set of operations. The one or more remaining operations includes the I/O operation.

Web service 114 may identify an I/O operation in a variety of ways. In the example illustrated in FIG. 1, web service 114 is coupled to a list of I/O classes 124 and a safety I/O classloader 126. List of I/O classes 124 includes one or more libraries including I/O operations. Web service 114 may load classes through safety I/O classloader 126, and safety I/O classloader 126 may load a class on demand. In an example, Web service 114 loads classes only through safety I/O classloader 126 to ensure that no I/O operation is executed before request 108 is determined to be successfully authenticated. In an embodiment, safety I/O classloader 126 is a Java classloader that reads a list of all "low level" Java libraries that contain I/O operations. An example of an I/O operation is a System, JDBC driver, InputStream, or OutputStream. The list of I/O operations may be configured and/or updated by an administrator. In an embodiment, a list of I/O classes is assigned to a Web service so that each Web service has its own list of I/O operations to optimize processing of requests. Server 104 may have a list of I/O classes that will be used if a Web service does not have an assigned list of I/O classes.

In an example, safety I/O classloader 126 reads list of I/O classes 124, which may include one or more classes that include an I/O operation. Safety I/O classloader 126 receives a request to load one or more classes and accesses list of I/O classes 124. Safety I/O classloader 126 does not load a class that includes an I/O operation until security component 112 sets the value of the authentication flag to a value indicating that request 108 has been successfully authenticated. Accordingly, if Web service 114 does not have the class loaded, Web service 114 does not continue to process the request.

When safety I/O classloader 126 receives a request from an instance to load a class, safety I/O classloader 126 determines whether the instance is of the first type. For example, if instance 122 sends a request to load a class, safety I/O classloader 126 may determine that the requesting instance is of the first type. When the requesting instance is determined to not be of the first type, safety I/O classloader 126 loads the requested class. In contrast, when the requesting instance is determined to be of the first type, safety I/O classloader 126 may identify the value of the authentication flag associated with the request identifier attribute of the requesting instance and stored in data structure 120. If a result of the request authentication has not yet been determined, safety I/O classloader 126 may wait for security component 112 to complete the request authentication before loading a class that contains an I/O operation.

When the authentication flag value indicates that the request has been successfully authenticated, safety I/O classloader 126 loads the requested class. When the authentication flag value indicates that authentication of the request is still pending, safety I/O classloader 126 determines whether a class name of the class is included in list of I/O classes 124. When the class name of the class is determined to be included in list of I/O classes 124, safety I/O classloader 126 waits for a time period and determines whether the request has been authenticated. Safety I/O classloader 126 may continue to wait and then determine whether the request has been authenticated until a result of the authentication is indicated in data structure 120. When the class name of the class is determined to not be included in list of I/O classes 124, safety I/O classloader 126 loads the class. In this situation, safety I/O classloader 126 may load the class because the requested class is not included in list of I/O classes 124 and thus safety I/O classloader 126 may conclude that the requested class does not include any I/O operations.

Authenticating and processing a request in parallel may be very efficient and provide benefits. If a high number of requests are received, however, authenticating and processing a request in parallel may overload server 104. For example, if an attacker wants to overload server 104, the attacker may send a high number of requests with incorrect credentials. In such an example, all the requests may be partially processed before the authentication fails, which may congest server 104. To avoid such a situation, server 104 may switch from a "parallel mode" to a "normal mode." In an example server 104 may enable a normal mode or a parallel mode. When the normal mode is enabled, the request is authenticated before Web service 114 initiates processing the request. When the parallel mode is enabled, the request is authenticated and processed in parallel. In an example, when server 104 is in the normal mode, security component 112 authenticates a request first before Web service 114 initiates processing of the request, and when server 104 is in the parallel mode, security component 112 authenticates and Web service 114 processes the request in parallel.

In an example, when server 104 has a threshold number of requests to authenticate and process in parallel, server 104 may switch to the normal mode. When the number of requests goes down to a second threshold number, software may switch back to the parallel mode. The first and second threshold numbers may be configurable by an administrator and may depend on, for example, how much processing power server 104 has. In another example, server 104 switches from one mode to another mode based on a time interval. In such an example, server 104 may enable the normal mode for a first time interval. After the first time interval has elapsed, server 104 may switch to the parallel mode for a second time interval. After the second time interval has elapsed, server 104 may switch back to the normal mode for the first time interval.

As discussed above and further emphasized here, FIGS. 1 and 2 are merely examples, which should not unduly limit the scope of the claims. For example, it should be understood that one or more modules or components (e.g., security component 112, Web service 114, and safety I/O classloader 126) in FIG. 1 may be combined with another module or component. It should also be understood that one or more modules or components in FIG. 1 may be separated into more than one module or component.

Further, although server 104 in FIG. 1 is illustrated as hosting one Web service, this is not intended to be limiting and server 104 may host one or more Web services. Additionally, the hash table described and illustrated in FIG. 2 is not intended to be limiting and other mechanisms to indicate a status of the request authentication are within the scope of the disclosure. Moreover, although security component 112, Web service 114, and safety I/O classloader 126 are illustrated as being in the same computing device (e.g., server 104), this is not intended to be limiting. For example, other embodiments in which security component 112, Web service 114, and/or safety I/O classloader 126 are in distributing computing devices are within the scope of the disclosure.

server 104 in FIG. 1 is illustrated as hosting one Web service, this is not intended to be limiting and server 104 may host one or more Web services. Additionally, the hash table described and illustrated in FIG. 2 is not intended to be limiting and other mechanisms to indicate a status of the request authentication are within the scope of the disclosure.

III. Example Method

Figure 4:
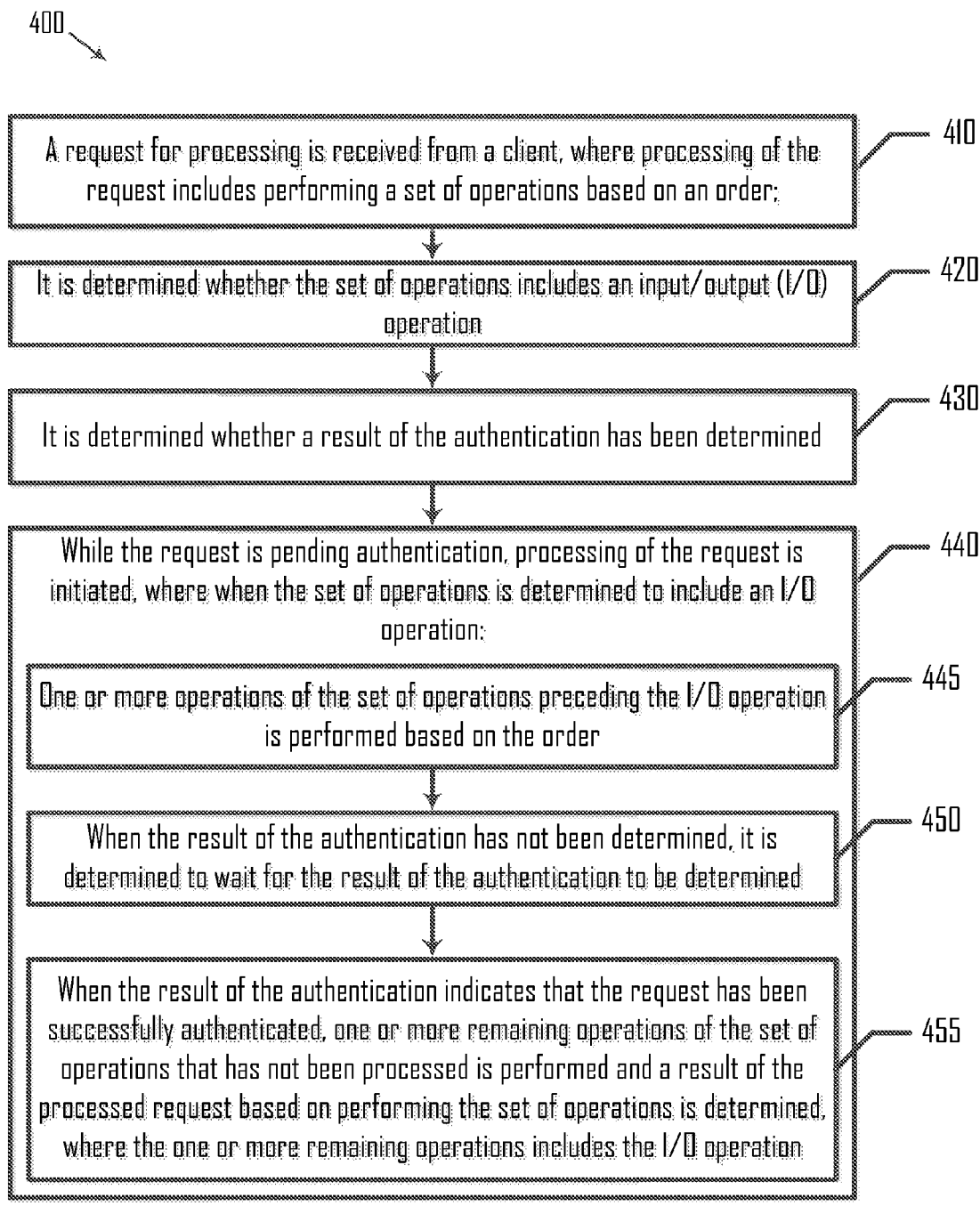
FIG. 4 is a flowchart illustrating a method of processing a request, according to an embodiment.

FIG. 4 is a flowchart illustrating a method 400 of processing a request, according to an embodiment. Method 400 is not meant to be limiting and may be used in other applications.

Method 400 includes blocks 410-455. In a block 410, a request for processing is received, where processing of the request includes performing a set of operations based on an order. In an example, server 104 receives, from client 102, request 108 for processing, where processing of request 108 includes performing a set of operations based on an order. In a block 420, it is determined whether the set of operations includes an input/output (I/O) operation. In an example, Web service 114 determines whether the set of operations includes an input/output (I/O) operation. In a block 430, it is determined whether a result of the authentication has been determined. In an example, Web service 114 determines whether a result of the authentication has been determined.

In a block 440, while the request is pending authentication, processing of the request is initiated, where when the set of operations is determined to include an I/O operation, blocks 445, 450, and 455 are performed. In block 445, one or more operations of the set of operations preceding the I/O operation is performed based on the order. In block 450, when the result of the authentication has not been determined, it is determined to wait for the result of the authentication to be determined. In a block 455, when the result of the authentication indicates that the request has been successfully authenticated, one or more remaining operations of the set of operations that has not been processed is performed and a result of the processed request based on performing the set of operations is determined, where the one or more remaining operations includes the I/O operation.

In an example, while request 108 is pending authentication, Web service 114 initiates processing of request 108, where when the set of operations is determined to include an I/O operation, (i) Web service 114 performs, based on the order, one or more operations of the set of operations preceding the I/O operation, (ii) when the result of the authentication has not been determined, Web service 114 waits for the result of the authentication to be determined, and (iii) when the result of the authentication indicates that request 108 has been successfully authenticated, Web service 114 performs one or more remaining operations of the set of operations that has not been processed and determines a result of the processed request based on performing the set of operations, where the one or more remaining operations includes the I/O operation.

It is also understood that additional processes may be inserted before, during, or after blocks 410-455 discussed above. It is also understood that one or more of the blocks of method 400 described herein may be omitted, combined, or performed in a different sequence as desired.

IV. Example Computing System

Figure 5:
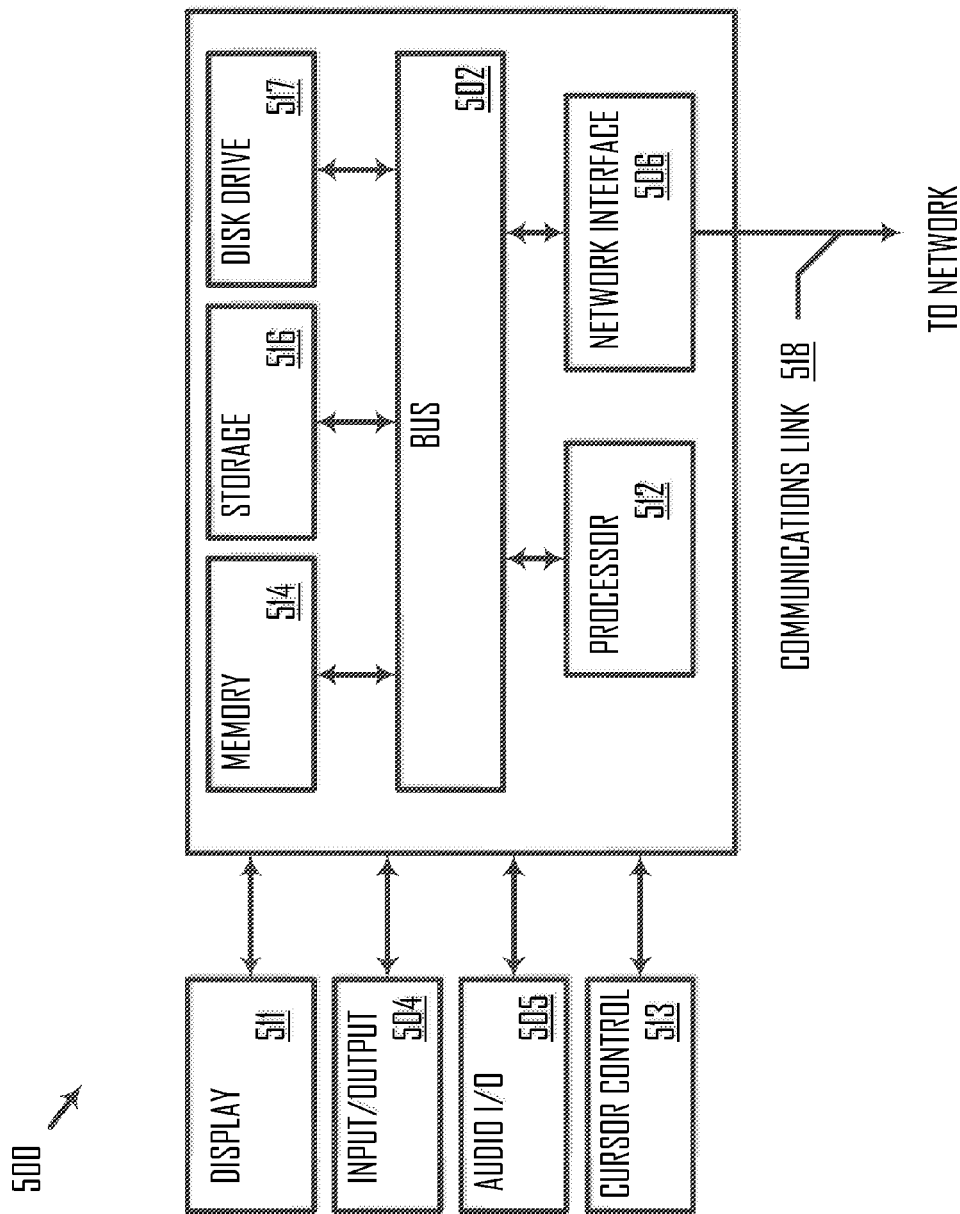
FIG. 5 is a block diagram of an electronic system suitable for implementing one or more embodiments of the present disclosure.

FIG. 5 is a block diagram of a computer system 500 suitable for implementing one or more embodiments of the present disclosure. Each of server 104, security component 112, Web service 114, and safety I/O classloader 126 may execute on a computing device. The computing device may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an I/O component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.). In an embodiment, if a request has been received and processing of the request includes processing of an I/O operation, Web service 114 may prevent I/O component 504 from persistent data.

An optional audio input/output component 505 may also be included to allow a user to use voice for inputting information by converting audio signals into information signals. Audio I/O component 505 may allow the user to hear audio. A transceiver or network interface 506 transmits and receives signals between computer system 500 and other devices via a communication link 518 to a network. In an embodiment, the transmission is wireless, although other transmission mediums and methods may also be suitable. A processor 512, which may be a micro-controller, digital signal processor (DSP), or other processing component, processes these various signals, such as for display on computer system 500 or transmission to other devices via communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 514, and transmission media includes coaxial cables, copper wire, and fiber optics, including wires that include bus 502. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of processing a request, comprising:
   receiving, at a Web service, a request for processing, wherein processing of the request includes performing a set of operations based on an order, and the request is from a client;
   determining that the set of operations includes an input/output (I/O) operation;
   authenticating the request from the client;
   determining whether a result of the authentication has been determined;
   while the request is pending the result of the authentication, initiating processing of the request; and
   in response to a determination that the set of operations is determined to include the I/O operation:
      performing, based on the order, one or more operations of the set of operations preceding the I/O operation;
      in response to a determination that the result of the authentication has not been determined, waiting for the result of the authentication to be determined; and
      in response to a determination that the result of the authentication indicates that the request has been successfully authenticated, performing, via the Web service, one or more remaining operations of the set of operations that has not been processed and determining, via the Web service, a result of the processed request based on performing the set of operations, wherein the one or more remaining operations includes the I/O operations
   creating a first request identifier that identifies the request;
   inserting into a data structure an entry that associates the first request identifier with an authentication flag value that indicates whether the request has been authenticated; and
   removing the entry from the data structure after the request has been processed.

2. The method of claim 1, wherein the determining whether a result of the authentication has been determined includes reading the authentication flag value stored in the data structure.

3. The method of claim 2, wherein the data structure is a hash table that stores one or more mappings of a request identifier to a value.

4. The method of claim 1, further including: receiving from an instance a second request to load one or more classes; determining whether the instance is of a first type; and in response to a determination that the instance is not of the first type, loading the requested class.

5. The method of claim 4, further including: in response to a determination that the instance is of the first type, identifying a value that is stored in the data structure and that is associated with a request identifier attribute of the instance; in response to a determination that the identified value indicates that the request has been successfully authenticated, loading the requested class; in response to a determination that the identified value indicates that authentication of the request is pending, determining whether the requested class is included in a list of one or more libraries including I/O operations; in response to a determination that the requested class is not included in the list, loading the requested class; and in response to a determination that the requested class is determined to be included in the list: waiting for a time period; determining whether the request has been authenticated; and in response to a determination that the result of the authentication indicates that the request has been successfully authenticated, loading the class.

6. The method of claim 1, further including: in response to a determination that the result of the authentication indicates that the request has failed authentication, halting processing of the request.

7. The method of claim 1, further including: enabling a normal mode, wherein enabling the normal mode includes authenticating the request before initiating processing of the request.

8. The method of claim 1, further including: enabling a parallel mode, wherein enabling the parallel mode includes authenticating and processing the request in parallel.

9. The method of claim 1, further including: instantiating an instance of a thread object of a first type including a request identifier attribute; inserting the request identifier as a value of the request identifier attribute into the instance; and initiating processing of the request using the instance.

10. A system for processing a request, comprising:
    a server interface that receives, from a client, a request for processing, wherein processing of the request includes performing a set of operations based on an order;
    a security component that authenticates the request from the client;
    a Web service that determines that the set of operations includes an input/output (I/O) operation and determines whether a result of the authentication has been determined,
    wherein while the request is pending authentication, the Web service initiates processing to include the I/O operation, (i) the Web service performs, based on the order, one or more operations of the set of operations preceding the I/O operation, (ii) in response to a determination that the result of the authentication has not been determined, the Web service waits for the result of the authentication to be determined, and (iii) in response to a determination that the result of the authentication indicates that the request has been successfully authenticated, the Web service performs one or more remaining operations of the set of operations that has not been processed and determines a result of the processed request based on performing the set of operations, wherein the one or more remaining operations includes the I/O operation; and
    a memory that stores a data structure, wherein the Web service creates a first request identifier that identifies the request, inserts into the data structure an entry that associates the first request identifier with a first value that indicates whether the request has been authenticated, and removes the entry from the data structure after the request has been processed.

11. The system of claim 10, wherein the Web service ensures that no I/O operations are performed until the request has been successfully authenticated.

12. The system of claim 10, further including a server that includes the server interface, Web service, and security component, wherein the server switches between a normal mode and a parallel mode, and wherein when the server is in the parallel mode, the Web service authenticates and processes the request in parallel and when the server is in the normal mode, the web service authenticates the request before the Web service initiates processing the request.

13. The system of claim 10, wherein the Web service instantiates an instance of a thread object of a first type including a request identifier attribute, inserts the request identifier as a value of the request identifier attribute into the instance, and initiates processing of the request using the instance.

14. The system of claim 10, wherein the security component sets the flag value based on whether the request has been successfully authenticated or has failed authentication.

15. A non-transitory machine-readable medium comprising a plurality of machine-readable instructions that when executed by one or more processors is adapted to cause the one or more processors to perform a method comprising:

receiving, at a Web service, a request for processing, wherein processing of the request includes performing a set of operations based on an order, and the request is from a client;

determining that the set of operations includes an input/output (I/O) operation;

authenticating the request from the client;

determining whether a result of the authentication has been determined;

while the request is pending the result of the authentication, initiating processing of the request; and in response to a determination that the set of operations is determined to include the I/O operation:

performing, based on the order, one or more operations of the set of operations preceding the I/O operation;

in response to a determination that the result of the authentication has not been determined, waiting for the result of the authentication to be determined; and in response to a determination that the result of the authentication indicates that the request has been successfully authenticated, performing, via the Web service, one or more remaining operations of the set of operations that has not been processed and determining, via the Web service, a result of the processed request based on performing the set of operations, wherein the one or more remaining operations includes the I/O operations creating a first request identifier that identifies the request;

inserting into a data structure an entry that associates the first request identifier with an authentication flag value that indicates whether the request has been authenticated: and removing the entry from the data structure after the request has been processed.

* * * * *